US012561064B2

(12) United States Patent
    Chien et al.

(10) Patent No.:    US 12,561,064 B2
(45) Date of Patent:       Feb. 24, 2026

(54) MEMORY MANAGEMENT METHOD, MEMORY STORAGE DEVICE, AND MEMORY CONTROL CIRCUIT UNIT

(71) Applicant: PHISON ELECTRONICS CORP., Miaoli (TW)

(72) Inventors: Jia-Fan Chien, Taichung (TW); Wei Lin, Taipei (TW); Yu-Cheng Hsu, Yilan County (TW); Yu-Siang Yang, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 19 days.

(21) Appl. No.: 17/498,771

(22) Filed: Oct. 12, 2021

(65) Prior Publication Data

US 2023/0071724 A1    Mar. 9, 2023

(30) Foreign Application Priority Data

Sep. 8, 2021    (TW) ................................. 110133461

(51) Int. Cl.
    *G06F 3/06*       (2006.01)
    *G06F 11/30*      (2006.01)
(52) U.S. Cl.
    CPC .......... *G06F 3/0616* (2013.01); *G06F 3/0613* (2013.01); *G06F 3/0634* (2013.01); *G06F 3/0659* (2013.01); *G06F 3/0679* (2013.01); *G06F 11/3058* (2013.01); *G06F 11/3075* (2013.01)
(58) Field of Classification Search
    None
    See application file for complete search history.

(56) References Cited

U.S. PATENT DOCUMENTS

| 10,685,711 | B1 * | 6/2020 | Lin ........................ G06F 3/0652 |
| 2009/0161466 | A1 | 6/2009 | Hamilton et al. |
| 2016/0322113 | A1 | 11/2016 | Parker |
| 2017/0271031 | A1 * | 9/2017 | Sharon ................... G11C 29/52 |

(Continued)

FOREIGN PATENT DOCUMENTS

| TW | 202025162 | 7/2020 |
| WO | 2021035436 | 3/2021 |

OTHER PUBLICATIONS

"Office Action of Taiwan Counterpart Application", issued on Aug. 9, 2022, p. 1-p. 7.

(Continued)

*Primary Examiner* — Michael Alsip
(74) *Attorney, Agent, or Firm* — JCIPRNET

(57)                ABSTRACT

A memory management method, a memory storage device, and a memory control circuit unit are provided. The method includes: detecting a first temperature status of a rewritable non-volatile memory module; performing a first write operation on a first physical unit under the first temperature status to store first data to the first physical unit; after performing the first write operation, detecting a second temperature status of the rewritable non-volatile memory module; in response to the first temperature status and the second temperature status meeting a first condition, performing a data refresh operation on the first physical unit under the second temperature status to re-store the first data to a second physical unit different from the first physical unit.

23 Claims, 11 Drawing Sheets

(56)  References Cited

U.S. PATENT DOCUMENTS

2020/0004458 A1 *  1/2020  Cerafogli ................. G11C 7/04
2020/0225852 A1     7/2020  Sharon et al.

OTHER PUBLICATIONS

"Office Action of Taiwan Counterpart Application", issued on Mar.
4, 2024, p. 1-p. 11.
"Office Action of Taiwan Counterpart Application", issued on May
15, 2024, p. 1-p. 15.

* cited by examiner

MEMORY MANAGEMENT METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 110133461, filed on Sep. 8, 2021. The entirety of the above-mentioned patent application is hereby incorporated by reference herein and made a part of this specification.

BACKGROUND

Technical Field

The disclosure relates to memory management technology, and particularly relates to a memory management method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small size, and no mechanical structure, the rewritable non-volatile memory module is very suitable for being built into the various portable electronic devices exemplified above.

Memory cells in the rewritable non-volatile memory module stores data in the form of voltage. For example, data is stored through applying a write voltage to the memory cells and/or data is read through applying a read voltage to the memory cells. However, if the temperature difference between reading and writing to a certain memory cell is too large, the error rate of data subsequently read from the memory cell may be greatly increased.

SUMMARY

The disclosure provides a memory management method, a memory storage device, and a memory control circuit unit, which can improve reliability when accessing data from a rewritable non-volatile memory module in an environment with relatively drastic temperature changes.

An exemplary embodiment of the disclosure provides a memory management method, which is used in a memory storage device. The memory storage device includes a rewritable non-volatile memory module. The rewritable non-volatile memory module includes multiple physical units. The memory management method includes the following steps. A first temperature status of the rewritable non-volatile memory module is detected. A first write operation is performed on a first physical unit among the physical units under the first temperature status to store first data to the first physical unit. After performing the first write operation, a second temperature status of the rewritable non-volatile memory module is detected. In response to the first temperature status and the second temperature status meeting a first condition, a data refresh operation is performed on the first physical unit under the second temperature status to re-store the first data to a second physical unit among the physical units. The second physical unit is different from the first physical unit.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple physical units. The memory control circuit unit is coupled to the connection interface unit and the rewritable non-volatile memory module. The memory control circuit unit is used to detect a first temperature status of the rewritable non-volatile memory module. The memory control circuit unit is further used to perform a first write operation on a first physical unit among the physical units under the first temperature status to store first data to the first physical unit. After performing the first write operation, the memory control circuit unit is further used to detect a second temperature status of the rewritable non-volatile memory module. In response to the first temperature status and the second temperature status meeting a first condition, the memory control circuit unit is further used to perform a data refresh operation on the first physical unit under the second temperature status to re-store the first data to a second physical unit among the physical units. The second physical unit is different from the first physical unit.

The exemplary embodiment of the disclosure further provides a memory control circuit unit, which is used to control a rewritable non-volatile memory module. The rewritable non-volatile memory module includes multiple physical units. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory control circuit unit is used to detect a first temperature status of the rewritable non-volatile memory module. The memory management circuit is further used to perform a first write operation on a first physical unit among the physical units under the first temperature status to store first data to the first physical unit. After performing the first write operation, the memory management circuit is further used to detect a second temperature status of the rewritable non-volatile memory module. In response to the first temperature status and the second temperature status meeting a first condition, the memory management circuit is further used to perform a data refresh operation on the first physical unit under the second temperature status to re-store the first data to a second physical unit among the physical units. The second physical unit is different from the first physical unit.

Based on the above, after performing the first write operation on the first physical unit under the first temperature status of the rewritable non-volatile memory module to store the first data, the second temperature status of the rewritable non-volatile memory module may be detected. In response to the first temperature status and the second temperature status meeting the first condition, the data refresh operation may be performed on the first physical unit under the second temperature status to re-store the first data to the second physical unit different from the first physical unit. In this way, reliability when accessing data from the rewritable non-volatile memory module in an environment with relatively drastic temperature changes can be improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
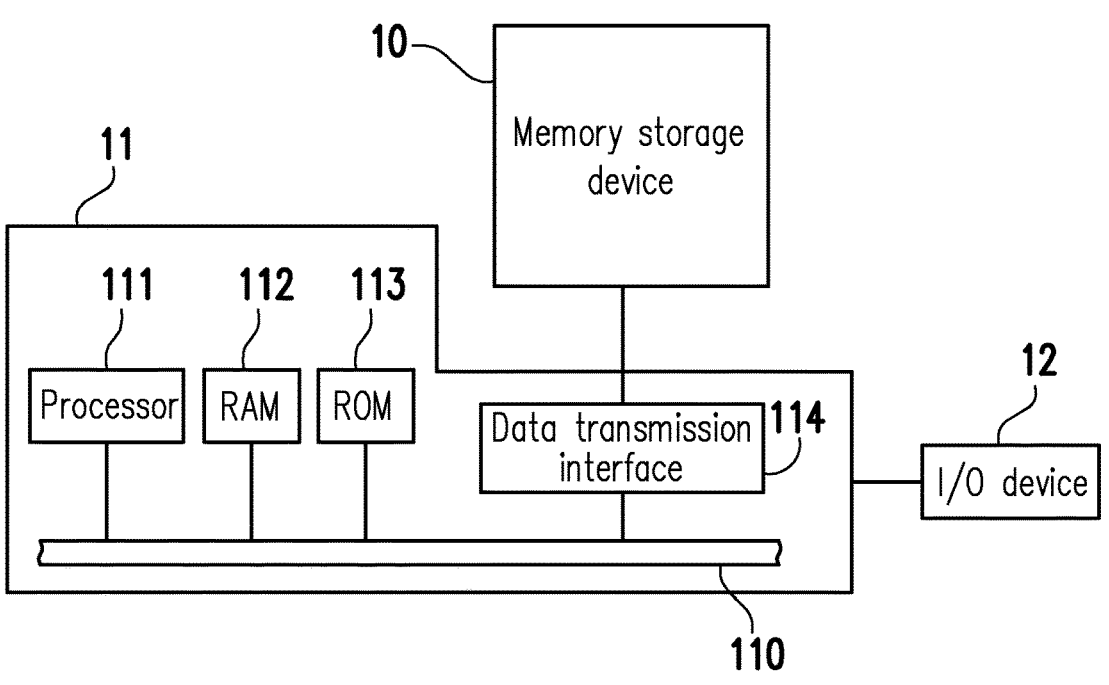
FIG. 1 is a schematic diagram of a host system, a memory storage device, and an input/output (I/O) device according to an exemplary embodiment of the disclosure.
Figure 2:
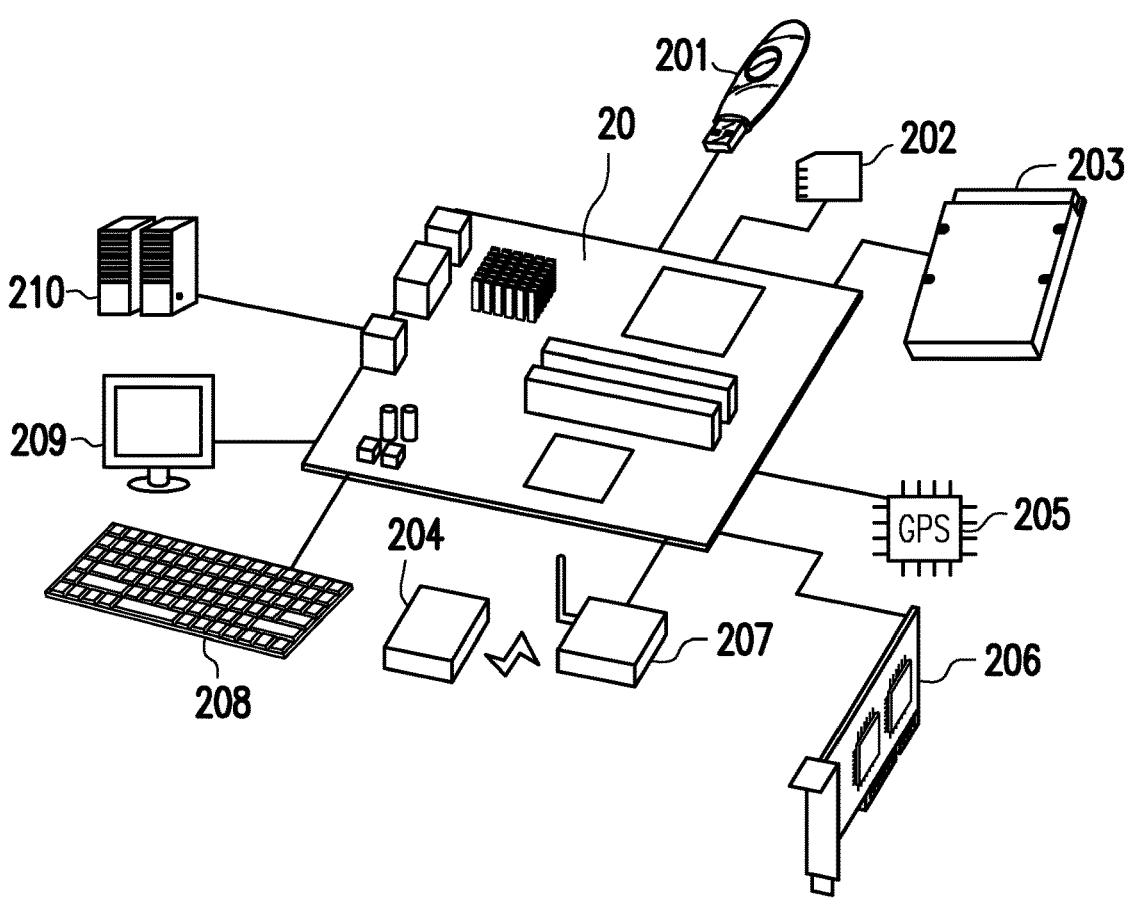
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
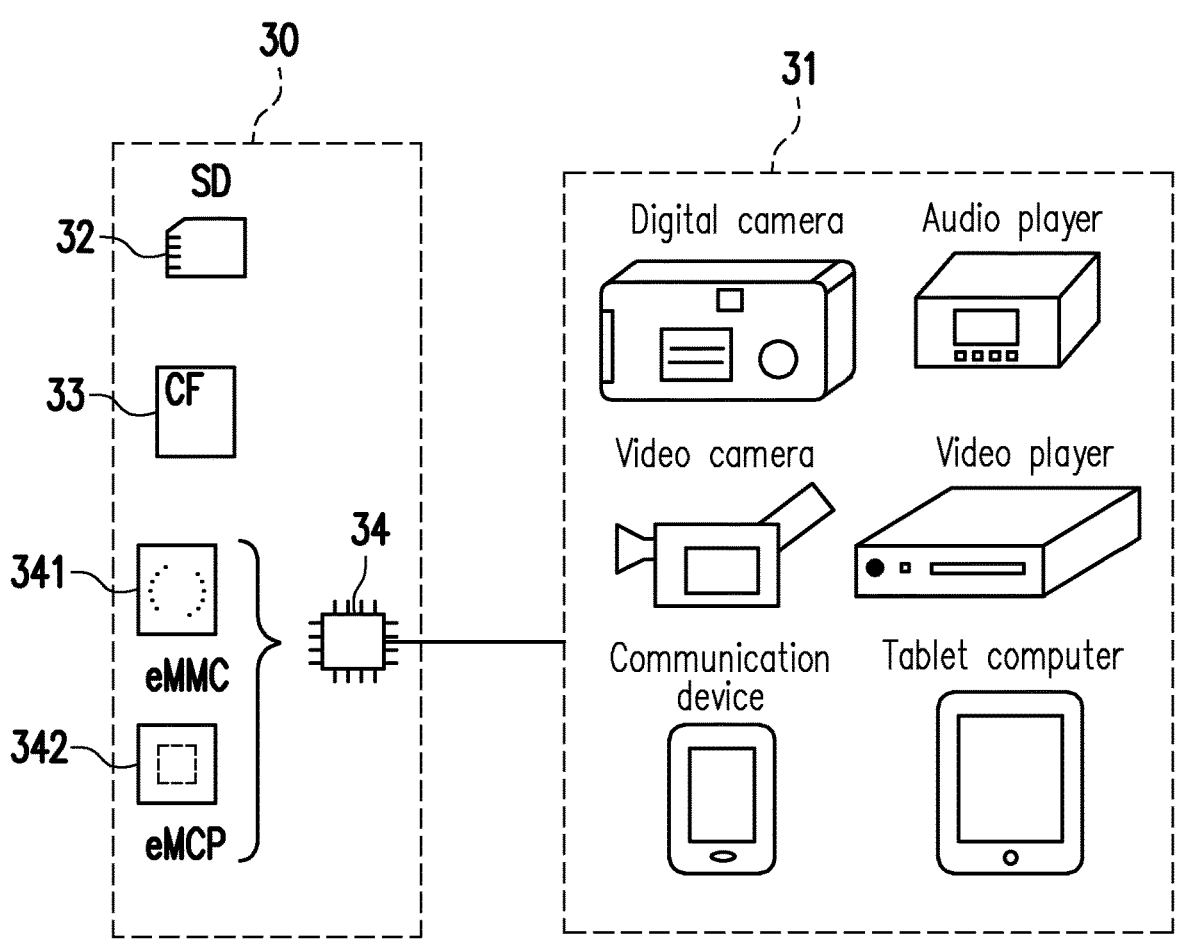
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
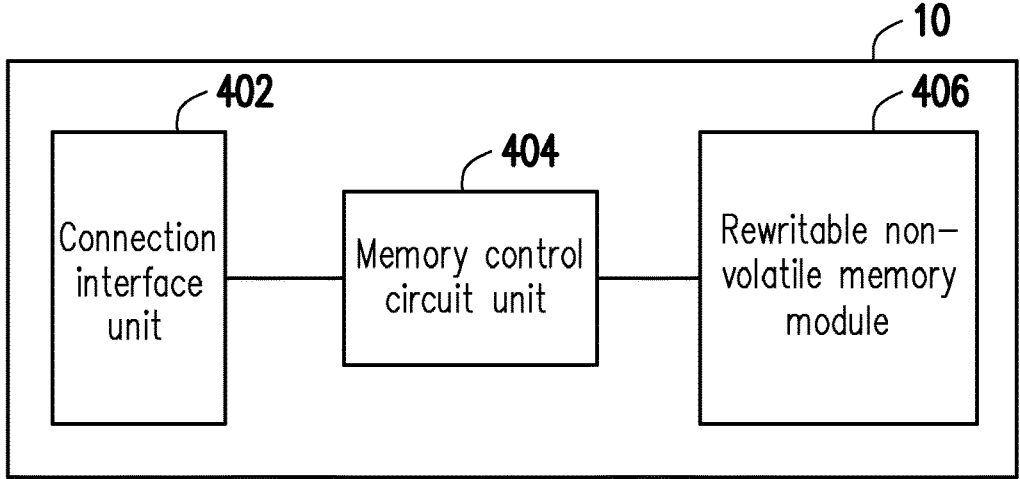
FIG. 4 is a schematic block diagram of a memory storage device according to an exemplary embodiment of the disclosure.

FIG. 4 is a schematic block diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in a chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
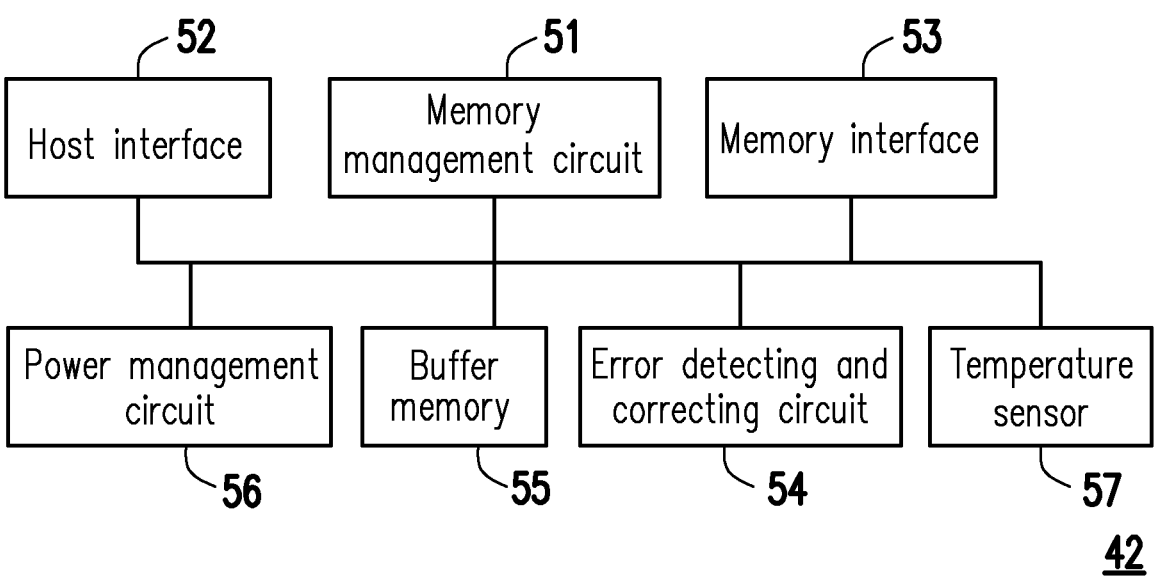
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In another exemplary embodiment, the control commands of the memory management circuit 51 may also be stored in a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, performing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data will also be read, and the error detecting and correcting circuit 54 will perform error detecting and correcting operations on the read data according to the error correcting code and/or the error detecting code. For example, the error detecting and correcting circuit 54 may support various encoding/decoding algorithms such as low density parity check (LDPC) codes or BCH codes.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the memory control circuit unit 42 further includes a temperature sensor 57. The temperature sensor 57 is coupled to the memory management circuit 51. The temperature sensor 57 is used to sense the ambient temperature and provide a corresponding temperature value. In an exemplary embodiment, the memory management circuit 51 may obtain a current temperature status of the rewritable non-volatile memory module 43 according to the temperature value provided by the temperature sensor 57. The temperature status may be represented by a specific status parameter or directly represented by the temperature value, which is not limited by the disclosure. In addition, the temperature sensor 57 may be disposed inside or outside the memory control circuit unit 42, which is not limited by the disclosure.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
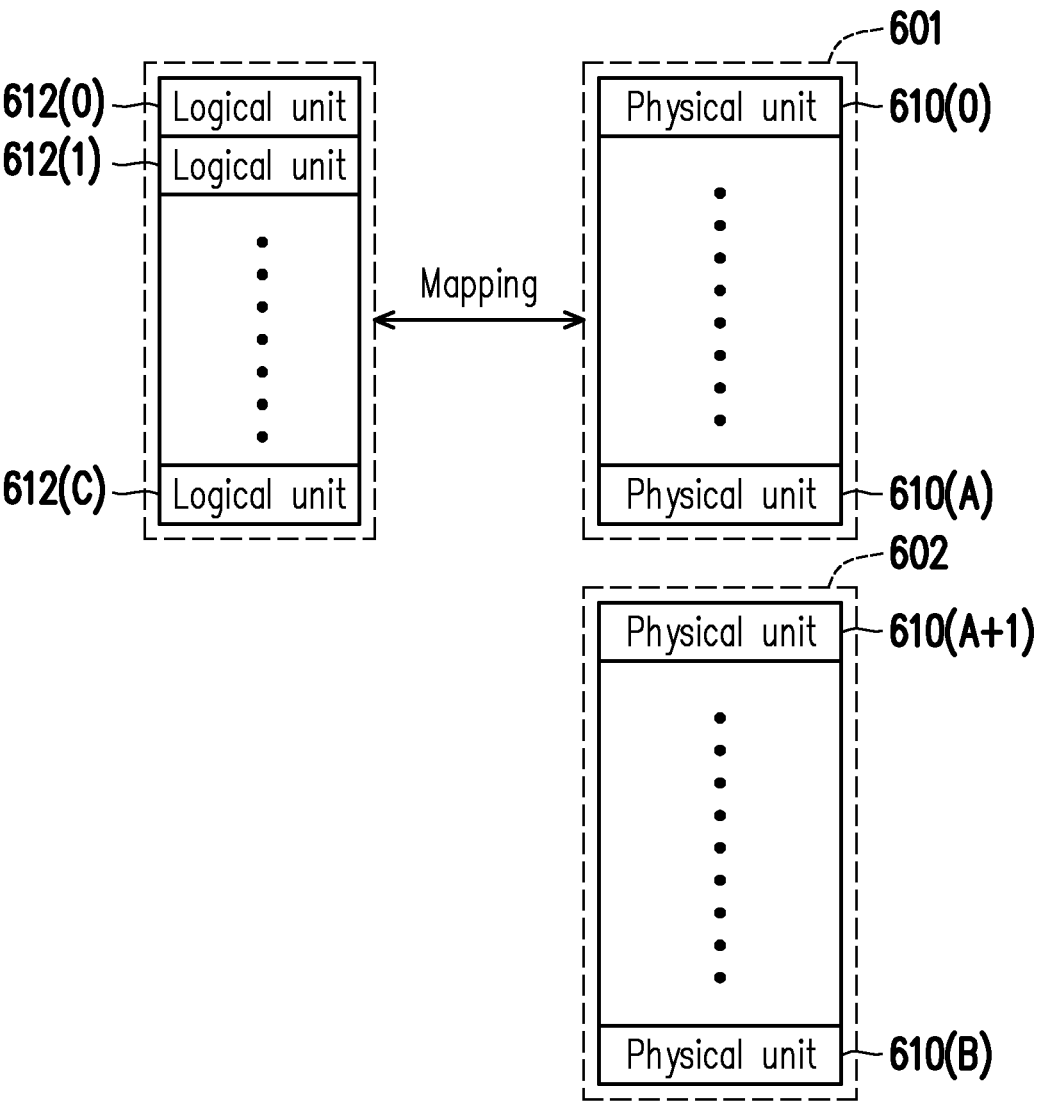
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602. A physical unit refers to a virtual block (VB). One virtual block may include multiple physical programming units. For example, one virtual block may contain one or more physical erasing units.

The physical units 610(0) to 610(A) in the storage area 601 are used to store user data (for example, the user data from the host system 11 of FIG. 1). For example, the physical units 610(0) to 610(A) in the storage area 601 may store valid data and invalid data. The physical units 610(A+ 1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units.

It should be noted that one logical unit may be mapped to one or more physical units. If a certain physical unit is currently mapped by a certain logical unit, it means that data currently stored in the physical unit contains valid data. Conversely, if a certain physical unit is not currently mapped by any logical unit, it means that data currently stored in the physical unit does not contain any valid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, the memory management circuit 51 may detect and record a temperature status (also referred to as a first temperature status) of a certain physical unit (also referred to as a first physical unit) programmed to store data (also referred to as first data) in the rewritable non-volatile memory module 43. Thereafter, in response to a current temperature status (also referred to as a second temperature status) of the rewritable non-volatile memory module 43 and the first temperature status meeting a specific condition (also referred to as a first condition), the memory management circuit 51 may perform a data refresh operation on the first physical unit. Thereafter, under the second temperature status (or other temperature statuses), when the first data is read from the second physical unit, since the temperature status when the first data is programmed to the second physical unit and the temperature status when the first data is read from the second physical unit are the same or similar, the total number of error bits due to excessive temperature difference between reading and writing in the read first data can be reduced. In this way, reliability of data when accessing the data from the rewritable non-volatile memory module in an environment with relatively drastic temperature changes can be improved.

Figure 7:
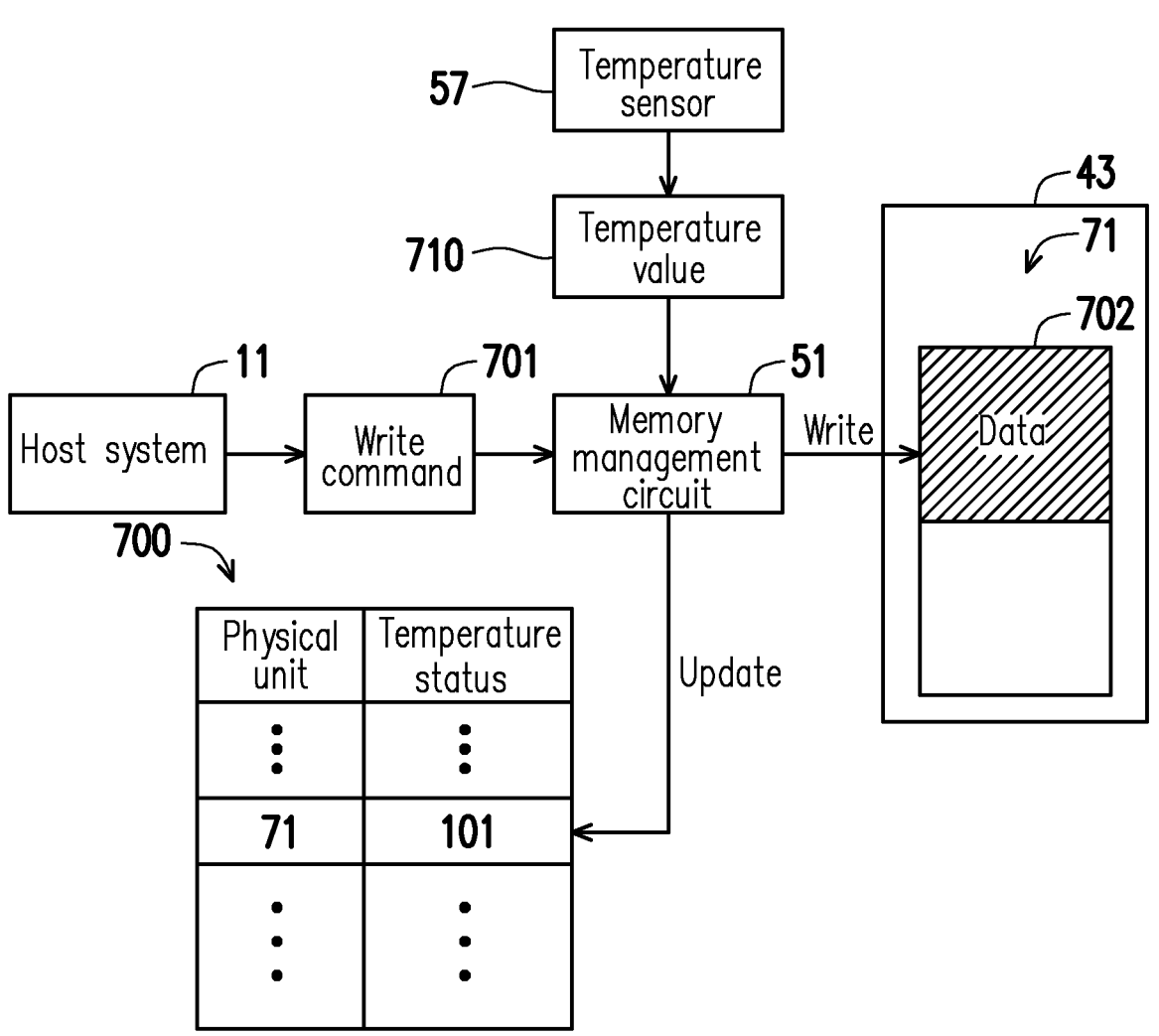
FIG. 7 is a schematic diagram of a first write operation according to an exemplary embodiment of the disclosure.

FIG. 7 is a schematic diagram of a first write operation according to an exemplary embodiment of the disclosure. Please refer to FIG. 7. The memory management circuit 51 may set a physical unit 71 (that is, the first physical unit) as an open unit (also referred to as an open block) to receive new data from the host system 11. For example, the physical unit 71 may be selected from the physical units 610(A+1) to 610(B) of FIG. 6. On the other hand, the memory management circuit 51 may detect the temperature status (that is, the first temperature status) of the rewritable non-volatile memory module 43. For example, the memory management circuit 51 may receive a temperature value 710 from the temperature sensor 57. The temperature value 710 may reflect the ambient temperature sensed by the temperature sensor 57 at a certain time point (also referred to as a first time point). The memory management circuit 51 may obtain the first temperature status according to the temperature value 710.

Under the first temperature status, the memory management circuit 51 may receive a write command 701 from the host system 11. The write command 701 may instruct to store data 702 (that is, the first data). For example, the write command 701 may instruct to store the data 702 to a specific logical unit. After receiving the write command 701, under the first temperature status, the memory management circuit 51 may perform a write operation (also referred to as the first write operation) on the physical unit 71. The first write operation may be used to store the data 702 instructed to be stored by the write command 701 to the physical unit 71. For example, the memory management circuit 51 may send at least one write command sequence to the rewritable non-volatile memory module 43 to instruct the rewritable non-volatile memory module 43 to store the data 702 to the physical unit 71 under the first temperature status.

Corresponding to storing the data 702 to the physical unit 71, the memory management circuit 51 may update table information 700. The table information 700 may be used to record the temperature status of at least one physical unit when being programmed most recently in the rewritable non-volatile memory module 43. For example, the temperature status may be represented by temperature status identification information and recorded in the table information 700. Under different temperature status, the temperature status identification information may have different parameter values.

In an exemplary embodiment of FIG. 7, the memory management circuit 51 may update the temperature status identification information corresponding to the physical unit 71 in the table information 700 to a parameter value "101". The parameter value 101 may be determined according to the temperature value 710 and reflect the temperature status (that is, the first temperature status) when the physical unit 71 is programmed to store the data 702. It should be noted that in another exemplary embodiment, the first temperature status may also be represented by other parameter values or directly represented by the temperature value 710, which is not limited by the disclosure.

Figure 8:
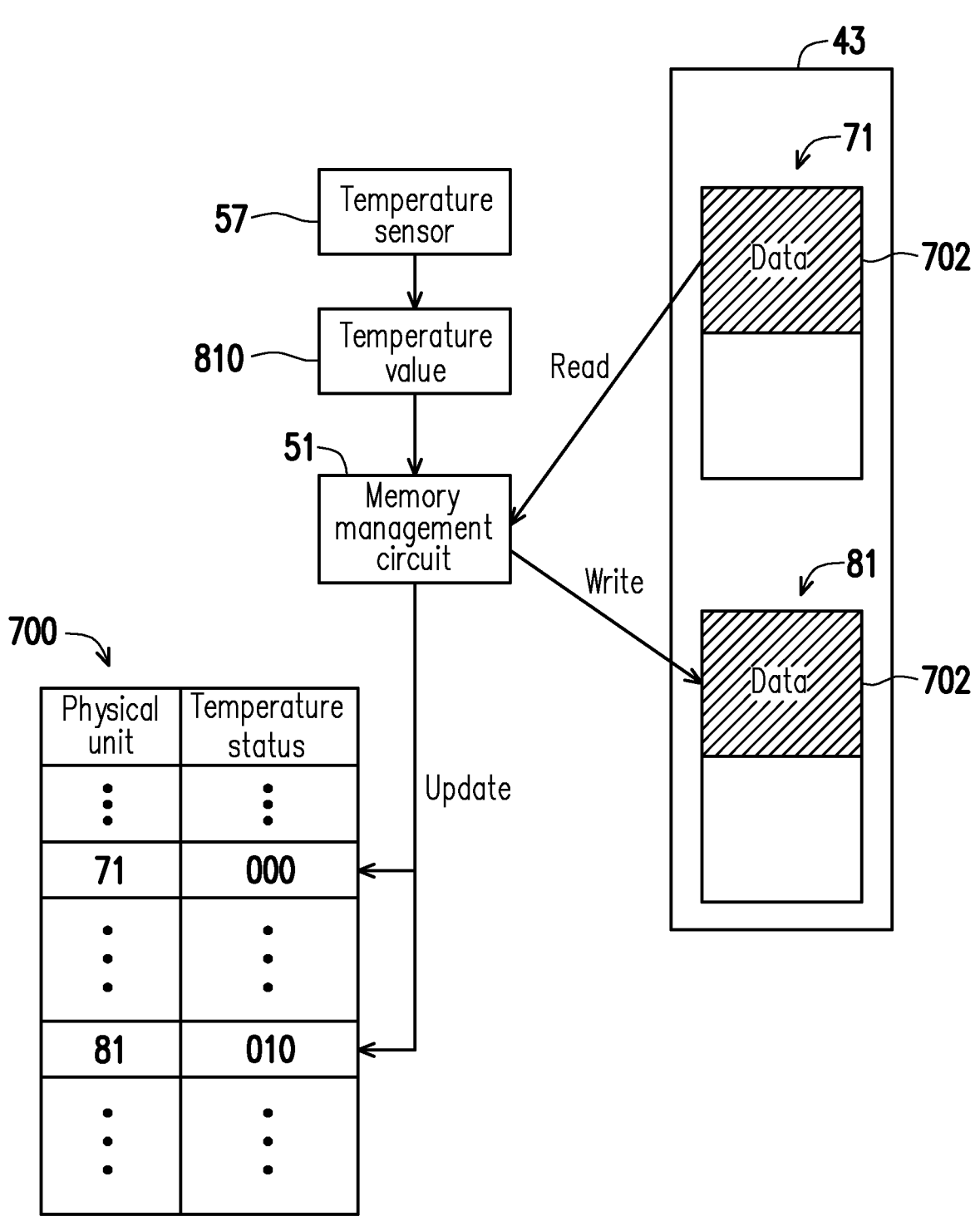
FIG. 8 is a schematic diagram of a data refresh operation according to an exemplary embodiment of the disclosure.

FIG. 8 is a schematic diagram of a data refresh operation according to an exemplary embodiment of the disclosure. Please refer to FIG. 8. Following the exemplary embodiment of FIG. 7, after performing the first write operation, the memory management circuit 51 may detect another temperature status (that is, the second temperature status) of the rewritable non-volatile memory module 43. For example, the memory management circuit 51 may receive a temperature value 810 from the temperature sensor 57. The temperature value 810 may reflect the ambient temperature sensed by the temperature sensor 57 at a certain time point (also referred to as a second time point). The second time point is later than the first time point. Between the first time point and the second time point, the temperature status of the rewritable non-volatile memory module 43 may change, for example, from the first temperature status to the second temperature status. The memory management circuit 51 may obtain the second temperature status according to the temperature value 810.

In an exemplary embodiment, the memory management circuit 51 may judge whether the first temperature status and the second temperature status meet a specific condition (that is, the first condition). For example, the first condition may include that a temperature difference value between the temperature value (for example, the temperature value 710 of FIG. 7) corresponding to the first temperature status and the temperature value (for example, the temperature value 810 of FIG. 8) corresponding to the second temperature status reaches a threshold or the temperature difference value falls within a specific value range.

In an exemplary embodiment, if the temperature difference value between the temperature value corresponding to the first temperature status and the temperature value corresponding to the second temperature status reaches a threshold, the memory management circuit 51 may judge that the first temperature status and the second temperature status meet the first condition. For example, the threshold may be 70 degrees. If the temperature difference value between the temperature value corresponding to the first temperature status and the temperature value corresponding to the second temperature status reaches 70 degrees, the memory management circuit 51 may judge that the first temperature status and the second temperature status meet the first condition. It should be noted that the threshold may be adjusted according to practical requirements and is not limited by the disclosure.

In an exemplary embodiment, if the temperature difference value between the temperature value corresponding to the first temperature status and the temperature value corresponding to the second temperature status falls within a specific value range, the memory management circuit 51 may judge that the first temperature status and the second temperature status meet the first condition. For example, the specific value range may be between 60 degrees and 80 degrees. If the temperature difference value between the temperature value corresponding to the first temperature status and the temperature value corresponding to the second temperature status falls between 60 degrees and 80 degrees, the memory management circuit 51 may judge that the first temperature status and the second temperature status meet the first condition. It should be noted that the specific value range may be adjusted according to practical requirements and is not limited by the disclosure.

In an exemplary embodiment of FIG. 8, it is assumed that the first temperature status and the second temperature status meet the first condition. In response to the first temperature status and the second temperature status meeting the first condition, the memory management circuit 51 may perform a data refresh operation on the physical unit 71 under the second temperature status. The data refresh operation is used to re-store the data 702 previously stored in the physical unit 71 under the first temperature status to the physical unit 81 (that is, the second physical unit) under the second temperature status. For example, the physical unit 81 may also be selected from the physical units 610(A+1) to 610(B) of FIG.

6, and the physical unit 81 is different from the physical unit 71. For example, the memory management circuit 51 may send at least one read command sequence to the rewritable non-volatile memory module 43 to instruct the rewritable non-volatile memory module 43 to read the data 702 from the physical unit 71 under the second temperature status. Then, the memory management circuit 51 may send at least one write command sequence to the rewritable non-volatile memory module 43 to instruct the rewritable non-volatile memory module 43 to re-store the read data 702 to the physical unit 81 under the second temperature status.

Corresponding to the data refresh operation, the memory management circuit 51 may update the table information 700. For example, according to the temperature value 810, the memory management circuit 51 may update the temperature status identification information corresponding to the physical unit 81 in the table information 700 to a parameter value "010" to reflect the temperature status (that is, the second temperature status) when the physical unit 81 is programmed to store the data 702. It should be noted that in another exemplary embodiment, the second temperature status may also be represented by other parameter values or directly represented by the temperature value 810, which is not limited by the disclosure.

In an exemplary embodiment, corresponding to the data refresh operation, the memory management circuit 51 may reset the temperature status identification information corresponding to the physical unit 71. For example, the memory management circuit 51 may reset the temperature status identification information corresponding to the physical unit 71 in the table information 700 to a parameter value "000". Thereafter, the memory management circuit 51 may re-associate the physical unit 71 to the spare area 602 of FIG. 6 and may erase the physical unit 71.

In an exemplary embodiment, a specific temperature status may correspond to a specific temperature range. For example, when the temperature of the rewritable non-volatile memory module 43 falls within a certain temperature range, the memory management circuit 51 may judge that the temperature status of the rewritable non-volatile memory module 43 is the temperature status corresponding to the temperature range. In addition, different temperature statuses may correspond to different temperature ranges. For example, the first temperature status may correspond to a first temperature range, and the second temperature status may correspond to a second temperature range. In an exemplary embodiment, the data refresh operation may include re-storing all or part of the data in the first physical unit to the second physical unit, and the data re-stored to the second physical unit may contain the data previously stored to the first physical unit under one or more temperature statuses.

In the exemplary embodiment of FIG. 7, the data 702 is stored or programmed to the physical unit 71 under the first temperature status. During a period of storing the data 702 to the physical unit 71, the temperature status of the rewritable non-volatile memory module 43 changes from the first temperature status to the second temperature status. In other words, the temperature of the rewritable non-volatile memory module 43 may gradually increase or decrease and enter another temperature range from the previous temperature range, and even further enter other temperature ranges. In an exemplary embodiment of FIG. 7, after the temperature status of the rewritable non-volatile memory module 43 is changed to the second temperature status, if the data refresh operation is not performed, with continuous temperature changes (for example, continuous increase or decrease) of the rewritable non-volatile memory module 43, the data 702 subsequently read from the physical unit 71 may carry more errors. The errors may reduce the subsequent decoding efficiency of the data 702, and may even cause the decoding of the data 702 to fail.

In an exemplary embodiment of FIG. 8, the memory management circuit 51 may perform the data refresh operation on the physical unit 71 as soon as possible when the temperature status of the rewritable non-volatile memory module 43 enters the second temperature status, so as to re-store the data 702 to the physical unit 81 under the second temperature status. At this time, since errors in the data 702 read from the physical unit 71 under the second temperature status have a high probability of being still in a controllable or acceptable status, there is a high probability that the data 702 can be successfully decoded (for example, all errors in the data 702 are successfully corrected). After re-storing the data 702 to the physical unit 81, the temperature of the rewritable non-volatile memory module 43 may continue to increase or decrease, and even enter another temperature range (also referred to as a third temperature range). Under the temperature status (also referred to as a third temperature status) corresponding to the third temperature range, compared to the data 702 read from the physical unit 71, errors in the data 702 read from the physical unit 81 may be more easily corrected, so that the subsequent decoding efficiency of the data 702 is improved. As such, reliability of data when accessing data from the rewritable non-volatile memory module 43 in an environment with relatively drastic temperature changes can be effectively improved.

In an exemplary embodiment, the data refresh operation may be triggered by a write command from the host system 11. For example, in an exemplary embodiment, the memory management circuit 51 may receive a write command from the host system 11. The memory management circuit 51 may judge whether the first temperature status and the second temperature status meet the first condition according to the write command, thereby determining whether to perform the data refresh operation. In an exemplary embodiment, the data refresh operation may be performed when the memory storage device 10 is in a spare status, before shutdown, after startup, or at any time point, which is not limited by the disclosure.

Figure 9:
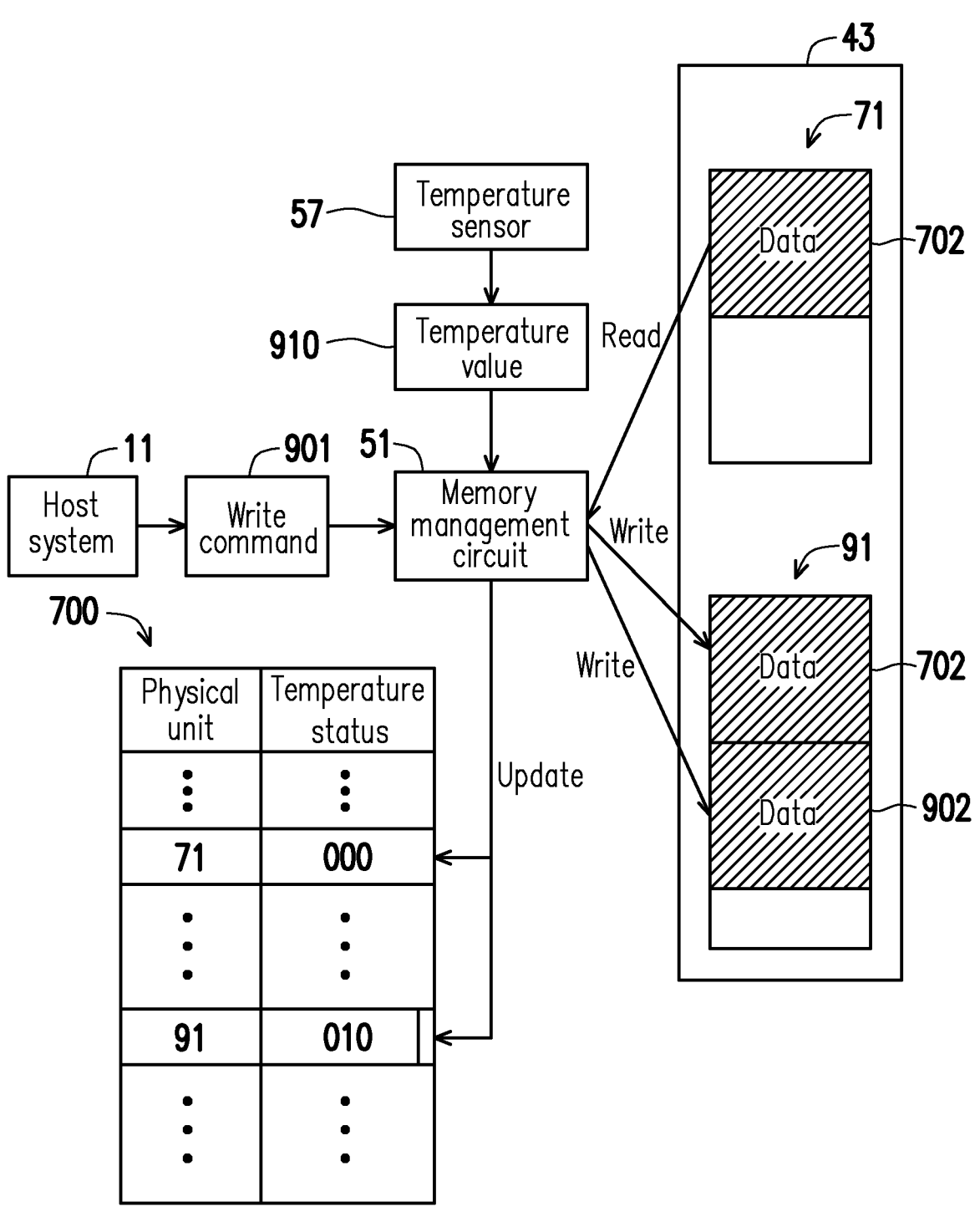
FIG. 9 is a schematic diagram of a data refresh operation and a second write operation according to an exemplary embodiment of the disclosure.

FIG. 9 is a schematic diagram of a data refresh operation and a second write operation according to an exemplary embodiment of the disclosure. Please refer to FIG. 9. Following the exemplary embodiment of FIG. 7, after performing the first write operation, the memory management circuit 51 may detect the second temperature status of the rewritable non-volatile memory module 43. For example, the memory management circuit 51 may receive a temperature value 910 from the temperature sensor 57. The temperature value 910 may reflect the ambient temperature sensed by the temperature sensor 57 at the second time point. The second time point is later than the first time point. The memory management circuit 51 may obtain the second temperature status according to the temperature value 910.

Near the second time point, the memory management circuit 51 may receive a write command 901 from the host system 11. The write command 901 may instruct to store data 902 (also referred to as second data). For example, the write command 901 may instruct to store the data 902 to a specific logical unit. In response to receiving the write command 901, the memory management circuit 51 may judge whether the first temperature status and the second temperature status meet the first condition.

In the exemplary embodiment of FIG. 9, it is assumed that the first temperature status and the second temperature status meet the first condition. In response to the first temperature status and the second temperature status meeting the first condition, the memory management circuit 51 may perform the data refresh operation on the physical unit 71 under the second temperature status. For example, during the data refresh operation, the memory management circuit 51 may send at least one read command sequence to the rewritable non-volatile memory module 43 to instruct the rewritable non-volatile memory module 43 to read the data 702 from the physical unit 71 under the second temperature status. Then, the memory management circuit 51 may send at least one write command sequence to the rewritable non-volatile memory module 43 to instruct the rewritable non-volatile memory module 43 to re-store the read data 702 to a physical unit 91 (that is, the second physical unit) under the second temperature status. For example, the physical unit 91 may also be selected from the physical units 610(A+1) to 610(B) of FIG. 6, and the physical unit 91 is different from the physical unit 71. In addition, corresponding to the data refresh operation, the memory management circuit 51 may update the table information 700. For example, the memory management circuit 51 may reset the temperature status identification information corresponding to the physical unit 71. For example, the memory management circuit 51 may reset the temperature status corresponding to the physical unit 71 in the table information 700 to the parameter value "000".

On the other hand, in response to the first temperature status and the second temperature status meeting the first condition, under the second temperature status, the memory management circuit 51 may perform a write operation (also referred to as the second write operation) on the physical unit 91 according to the write command 901. The second write operation is used to store the data 902 instructed to be stored by the write command 901 to the physical unit 91. For example, during the second write operation, the memory management circuit 51 may send at least one write command sequence to the rewritable non-volatile memory module 43 to instruct the rewritable non-volatile memory module 43 to store the data 902 to the physical unit 91 under the second temperature status. For example, in the physical unit 91, the data 902 may be stored before or after the data 702 (FIG. 9 is an example where the data 902 is stored after the data 702), which is not limited by the disclosure.

Corresponding to storing the data 902 to the physical unit 91, the memory management circuit 51 may update the table information 700. For example, according to the temperature value 910, the memory management circuit 51 may update the temperature status identification information corresponding to the physical unit 91 in the table information 700 to the parameter value "010" to reflect the temperature status (that is, the second temperature status) when the physical unit 91 is programmed to store the data 902. It should be noted that in another exemplary embodiment, the second temperature status may also be represented by other parameter values or directly represented by the temperature value 910, which is not limited by the disclosure.

It should be noted that in the exemplary embodiment of FIG. 7, the physical unit 71 is set as the open unit. Thereafter, in the exemplary embodiment of FIG. 8 or FIG. 9, the memory management circuit 51 may set the physical unit 81 or 91 as a new open unit to replace the physical unit 71. Thereafter, new data from the host system 11 may be stored to the physical unit 81 or 91.

In another exemplary embodiment of FIG. 9, when the write command 901 is received, the physical unit 71 is still the open unit. Therefore, the memory management circuit 51 may store the data 902 instructed to be stored by the write command 901 to the physical unit 71 first. At this time, the physical unit 71 is stored with the data 702 and 902 at the same time. Thereafter, in response to the first temperature status and the second temperature status meeting the first condition, under the second temperature status, the memory management circuit 51 may re-store the data 702 and 902 (and remaining data in the physical unit 71) to the physical unit 91 during the data refresh operation.

In an exemplary embodiment, if the first temperature status and the second temperature status do not meet the first condition, the memory management circuit 51 may not perform the data refresh operation on the physical unit 71. In the case where the data refresh operation is not performed, the physical unit 71 may be maintained as the open unit to continue receiving new data from the host system 11 until the physical unit 71 is fully written.

Figure 10:
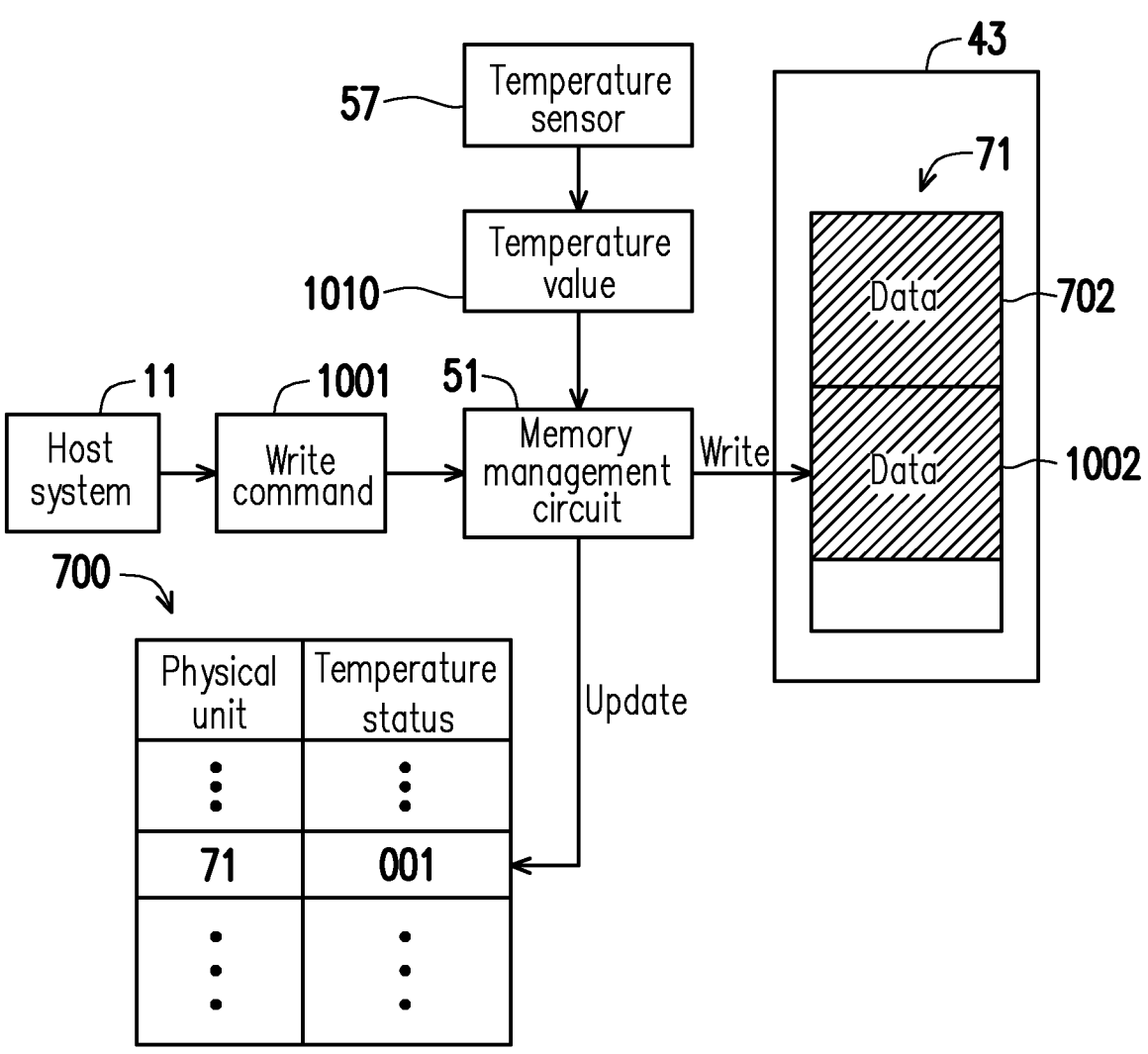
FIG. 10 is a schematic diagram of a third write operation according to an exemplary embodiment of the disclosure.

FIG. 10 is a schematic diagram of a third write operation according to an exemplary embodiment of the disclosure. Please refer to FIG. 10. Following the exemplary embodiment of FIG. 7, after performing the first write operation, the memory management circuit 51 may detect the second temperature status of the rewritable non-volatile memory module 43. For example, the memory management circuit 51 may receive a temperature value 1010 from the temperature sensor 57. The temperature value 1010 may reflect the ambient temperature sensed by the temperature sensor 57 at the second time point. The second time point is later than the first time point. The memory management circuit 51 may obtain the second temperature status according to the temperature value 1010.

Near the second time point, the memory management circuit 51 may receive a write command 1001 from the host system 11. The write command 1001 may instruct to store data 1002 (that is, the second data). For example, the write command 1001 may instruct to store the data 1002 to a specific logical unit. In response to receiving the write command 1001, the memory management circuit 51 may judge whether the first temperature status and the second temperature status meet the first condition.

In the exemplary embodiment of FIG. 10, it is assumed that the first temperature status and the second temperature status do not meet the first condition. In response to the first temperature status and the second temperature status not meeting the first condition, the memory management circuit 51 may not perform the data refresh operation on the physical unit 71. Instead, under the second temperature status, the memory management circuit 51 may perform a write operation (also referred to as the third write operation) on the physical unit 71 according to the write command 1001. The third write operation is used to store the data 1002 instructed to be stored by the write command 1001 to the physical unit 71. For example, during the third write operation, the memory management circuit 51 may send at least one write command sequence to the rewritable non-volatile memory module 43 to instruct the rewritable non-volatile memory module 43 to store the data 1002 to the physical unit 71 under the second temperature status. For example, in the physical unit 71, the data 1002 may be stored after the data 702, as shown in FIG. 10.

Corresponding to storing the data 1002 to the physical unit 71, the memory management circuit 51 may update the table information 700. For example, according to the temperature value 1010, the memory management circuit 51 may update the temperature status identification information corresponding to the physical unit 71 in the table information 700 from the parameter value "101" of FIG. 7 to a parameter value "001". The parameter value "001" may reflect the temperature status (that is, the second temperature status) when the physical unit 71 is programmed to store the data 1002. It should be noted that in another exemplary embodiment, the second temperature status may also be represented by other parameter values or directly represented by the temperature value 1010, which is not limited by the disclosure.

It should be noted that in the exemplary embodiment of FIG. 10, the memory management circuit 51 does not perform the data refresh operation on the physical unit 71 under the second temperature status. In this way, when temperature changes of the rewritable non-volatile memory module 43 are not much (for example, the temperature difference value does not reach the threshold or the temperature difference value does not fall within the specific value range), loss caused by excessively performing data transfer on the memory cells may be reduced.

It should be noted that the memory management circuit 51 may use one or more logical judgment manners to judge whether the first temperature status and the second temperature status meet the first condition, such as judging whether the temperature difference value between the temperature value corresponding to the first temperature status and the temperature value corresponding to the second temperature status reaches a threshold and/or judging whether the temperature difference value falls within a specific value range. Then, the memory management circuit 51 may determine whether to perform or trigger the data refresh operation according to a judgment result.

Figure 11:
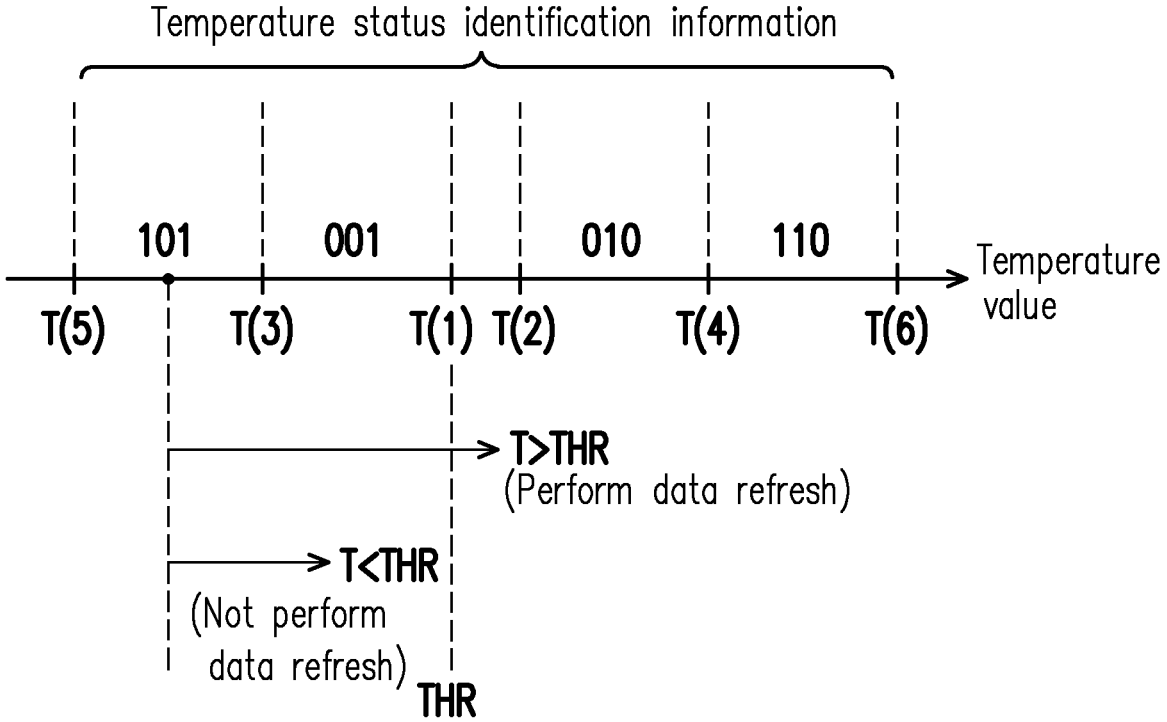
FIG. 11 is a schematic diagram of triggering or not triggering a data refresh operation under different temperature change statuses according to an exemplary embodiment of the disclosure.

FIG. 11 is a schematic diagram of triggering or not triggering a data refresh operation under different temperature change statuses according to an exemplary embodiment of the disclosure. Please refer to FIG. 11. The temperature status identification information corresponding to the first physical unit (for example, the physical unit 71 of FIG. 7) may contain parameter values "101", "001", "010", and "110". The parameter value "101" may reflect that the temperature of the first physical unit when being programmed most recently falls between temperature values T(5) to T(3). The parameter value "001" may reflect that the temperature of the first physical unit when being programmed most recently falls between temperature values T(3) to T(1). The parameter value "010" may reflect that the temperature of the first physical unit when being programmed most recently falls between the temperature values T(2) to T(4). The parameter value "110" may reflect that the temperature of the first physical unit when being programmed most recently falls between temperature values T(4) to T(6).

After a temperature change (for example, from the first temperature status to the second temperature status) occurs, the memory management circuit 51 may obtain a trigger threshold THR and a temperature value T of the rewritable non-volatile memory module 43 under the second temperature status. The trigger threshold THR may be determined corresponding to the first temperature status of the first physical unit. For example, assuming that the first temperature status of the first physical unit is represented by the parameter value 101 (that is, the temperature of the first physical unit when being programmed most recently falls between the temperature values T(5) to T(3)), the trigger threshold THR corresponding to the first physical unit may be set to be the same as or close to the temperature value T(1), as shown in FIG. 11. In other words, the trigger threshold THR may be used to judge whether the temperature difference value between the temperature value corresponding to the first temperature status and the temperature value corresponding to the second temperature status reaches a threshold. According to different first temperature statuses of the first physical unit, the determined trigger threshold THR may be different.

The memory management circuit 51 may compare the temperature value T with the trigger threshold THR. Then, the memory management circuit 51 may judge whether the first temperature status and the second temperature status meet the first condition according to a comparison result. For example, in an exemplary embodiment of FIG. 11, if the temperature value T is greater than the trigger threshold THR (equivalent to the temperature difference value between the first temperature status and the second temperature status reaching the threshold), the memory management circuit 51 may judge that the first temperature status and the second temperature status meet the first condition and trigger or activate the data refresh operation. Alternatively, in another exemplary embodiment of FIG. 11, if the temperature value T is not greater than the trigger threshold THR (equivalent to the temperature difference value between the first temperature status and the second temperature status not reaching the threshold), the memory management circuit 51 may judge that the first temperature status and the second temperature status do not meet the first condition and not trigger or activate the data refresh operation.

Figure 12:
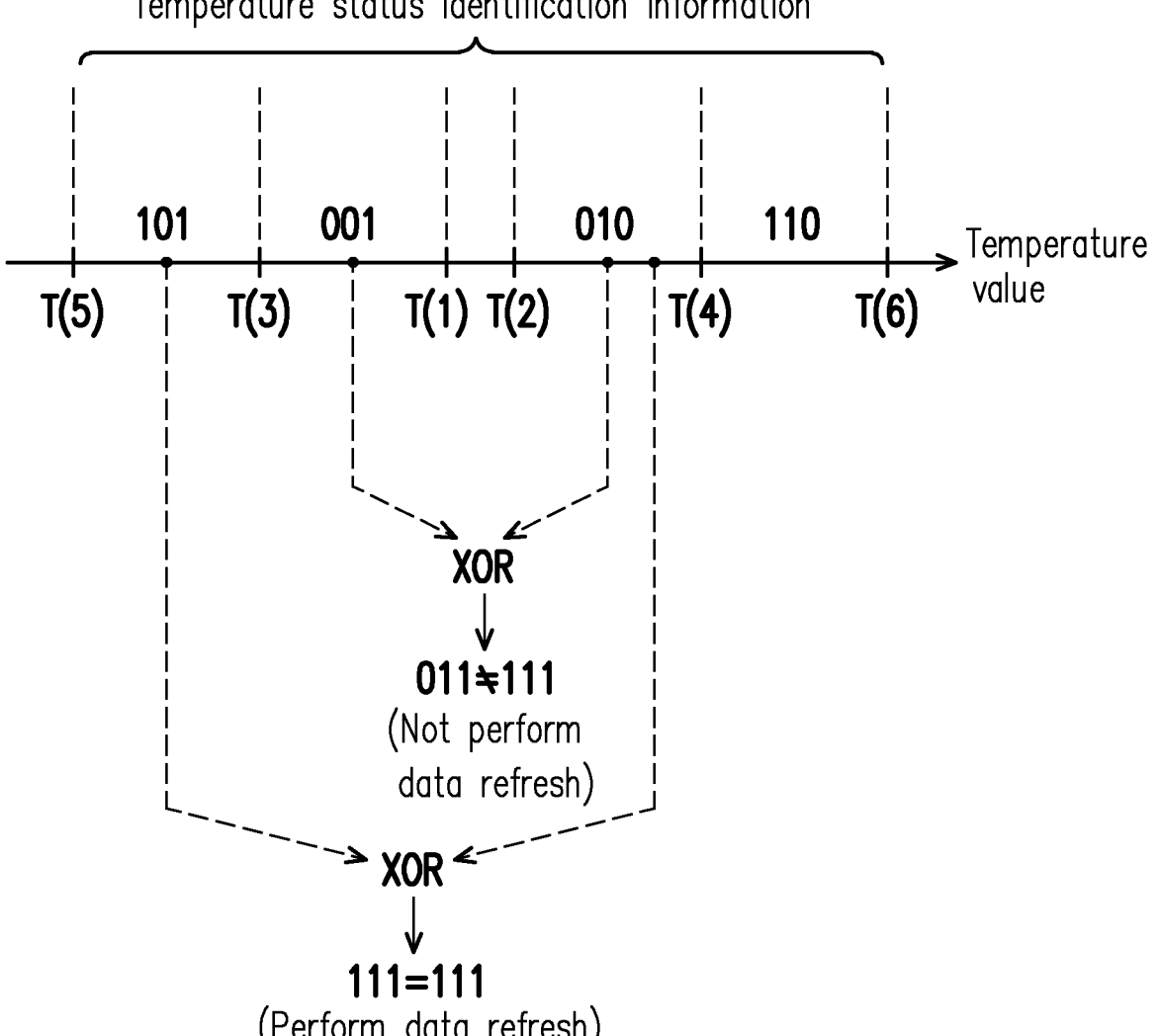
FIG. 12 is a schematic diagram of triggering or not triggering a data refresh operation under different temperature change statuses according to an exemplary embodiment of the disclosure.

FIG. 12 is a schematic diagram of triggering or not triggering a data refresh operation under different temperature change statuses according to an exemplary embodiment of the disclosure. Please refer to FIG. 12. The temperature status identification information corresponding to the first physical unit (for example, the physical unit 71 of FIG. 7) may contain the parameter values "101", "001", "010", and "110". After a temperature change occurs, the memory management circuit 51 may obtain the temperature status identification information (also referred to as first temperature status identification information) corresponding to the first temperature status of the first physical unit and the temperature status identification information (also referred to as second temperature status identification information) corresponding to the second temperature status. The memory management circuit 51 may perform a logical operation on the first temperature status identification information and the second temperature status identification information. For example, the logical operation may include an exclusive OR (XOR) operation. The memory management circuit 51 may judge whether the first temperature status and the second temperature status meet the first condition according to a performance result of the logical operation.

For example, in an exemplary embodiment of FIG. 12, it is assumed that the first temperature status identification information corresponding to the first temperature status includes the parameter value "001" and the second temperature status identification information corresponding to the second temperature status includes the parameter value "010". According to the performance result of the logical operation (for example, the performance result of the XOR operation is "011", which is not equal to a preset value "111") (equivalent to the temperature difference value between the temperature value corresponding to the first temperature status and the temperature value corresponding to the second temperature status not falling within the specific value range), the memory management circuit 51 may judge that the first temperature status and the second temperature status do not meet the first condition and not trigger or activate the data refresh operation. Alternatively, in an exemplary embodiment of FIG. 12, it is assumed that the first temperature status identification information corresponding to the first temperature status includes the parameter value "101" and the second temperature status identification information corresponding to the second temperature status includes the parameter value "010". According to the performance result of the logical operation (for example, the performance result of the XOR operation is "111", which is equal to the preset value "111") (equivalent to the temperature difference value between the temperature value corresponding to the first temperature status and the temperature value corresponding to the second temperature status falling within the specific value range), the memory management circuit 51 may judge that the first temperature status and the second temperature status meet the first condition and trigger or activate the data refresh operation. It should be noted that the logical judgment manners mentioned in the exemplary embodiments of FIG. 11 and FIG. 12 are all examples and are not intended to limit the disclosure.

In an exemplary embodiment, the memory management circuit 51 may allow to activate the data refresh operation only after the temperature status of the rewritable non-volatile memory module 43 is changed and maintained under the second temperature status for more than a specific time. In this way, performing the data refresh operation too frequently due to frequent changes in the temperature status of the rewritable non-volatile memory module 43 may be avoided.

In an exemplary embodiment, under different temperature statuses, the memory management circuit 51 may instruct the rewritable non-volatile memory module 43 to use different electrical parameters to perform programming operations on the physical unit to satisfy the electronic characteristics of the memory cells in the rewritable non-volatile memory module 43 under different temperature statuses. For example, the electrical parameter may include programming voltage (that is, pulse voltage) and/or programming time, etc., which is not limited by the disclosure. For example, under the first temperature status, the memory management circuit 51 may instruct the rewritable non-volatile memory module 43 to use a specific electrical parameter (also referred to as a first electrical parameter) to program at least one memory cell in the first physical unit. Thereafter, under the second temperature status, the memory management circuit 51 may instruct the rewritable non-volatile memory module 43 to use a different electrical parameter (also referred to as a second electrical parameter) to program at least one memory cell in the first physical unit. In this way, the electronic characteristics of the memory cells in the rewritable non-volatile memory module 43 under different temperature statuses may be satisfied through different electrical parameters, so that a programmed memory cell has a preferred voltage status under the current temperature status.

Figure 13:
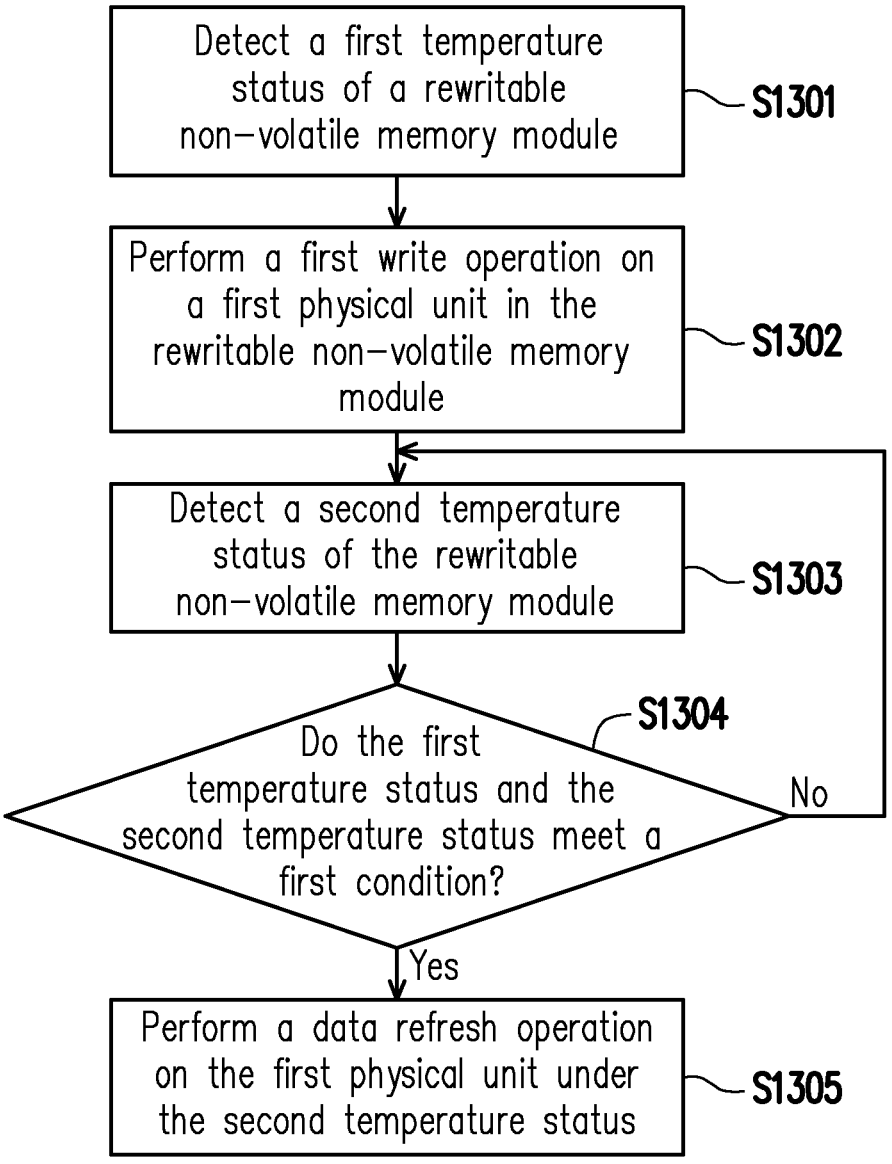
FIG. 13 is a flowchart of a memory management method according to an exemplary embodiment of the disclosure.

FIG. 13 is a flowchart of a memory management method according to an exemplary embodiment of the disclosure. Please refer to FIG. 13. In Step S1301, the first temperature status of the rewritable non-volatile memory module is detected. In Step S1302, under the first temperature status, the first write operation is performed on the first physical unit in the rewritable non-volatile memory module to store the first data to the first physical unit. After performing the first write operation, in Step S1303, the second temperature status of the rewritable non-volatile memory module is detected. In Step S1304, whether the first temperature status and the second temperature status meet the first condition is determined. In response to the first temperature status and the second temperature status meeting the first condition, in Step S1305, the data refresh operation is performed on the first physical unit under the second temperature status to re-store the first data to the second physical unit in the rewritable non-volatile memory module. The second physical unit is different from the first physical unit. In addition, if the first temperature status and the second temperature status do not meet the first condition, Step S1303 may be repeated.

However, each step in FIG. 13 has been described in detail as above and will not be repeated here. It is worth noting that each step in FIG. 13 may be implemented as multiple program codes or circuits, which is not limited by the disclosure. In addition, the method of FIG. 13 may be used in conjunction with the above exemplary embodiments or may be used alone, which is not limited by the disclosure.

In summary, in the exemplary embodiments proposed by the disclosure, the data refresh operation may be performed on the specific physical unit under an environment with relatively drastic temperature changes. In this way, reliability when accessing data from the rewritable non-volatile memory module in an environment with relatively drastic temperature changes can be improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A memory management method, used in a memory storage device, wherein the memory storage device comprises a rewritable non-volatile memory module, the rewritable non-volatile memory module comprises a plurality of physical units, and the memory management method comprises:

detecting a first temperature status of the rewritable non-volatile memory module;

performing a first write operation on a first physical unit among the plurality of physical units under the first temperature status to store first data to the first physical unit;

after performing the first write operation, detecting a second temperature status of the rewritable non-volatile memory module; and in response to the first temperature status and the second temperature status meeting a first condition, determining whether a temperature status of the rewritable non-volatile memory module is maintained under the second temperature status for more than a specific time period; and only after the temperature status of the rewritable non-volatile memory module being maintained under the second temperature status for more than the specific time period, performing a data refresh operation on the first physical unit under the second temperature status to re-store the first data to a second physical unit among the plurality of physical units, wherein the second physical unit is different from the first physical unit.

2. The memory management method according to claim 1, further comprising:

judging that the first temperature status and the second temperature status meet the first condition in response to a temperature difference value between a temperature value corresponding to the first temperature status and a temperature value corresponding to the second temperature status is greater than a threshold or falls within a specific value range.

3. The memory management method according to claim 1, further comprising:

obtaining first temperature status identification information corresponding to the first temperature status;

obtaining second temperature status identification information corresponding to the second temperature status;

performing a logical operation on the first temperature status identification information and the second temperature status identification information; and judging whether the first temperature status and the second temperature status meet the first condition according to a performance result of the logical operation.

4. The memory management method according to claim 1, wherein the step of detecting the second temperature status of the rewritable non-volatile memory module comprises:

receiving a write command from a host system; and in response to the write command, judging whether the first temperature status and the second temperature status meet the first condition.

5. The memory management method according to claim 4, further comprising:

in response to the first temperature status and the second temperature status meeting the first condition, performing a second write operation on the second physical unit under the second temperature status to store second data instructed by the write command to the second physical unit; and updating temperature status identification information corresponding to the second physical unit according to the second temperature status.

6. The memory management method according to claim 4, further comprising:

performing a second write operation on the first physical unit under the second temperature status to store second data instructed by the write command to the first physical unit; and during the data refresh operation, reading the first data along with the second data from the first physical unit to be stored to the second physical unit together.

7. The memory management method according to claim 4, further comprising:

recording temperature status identification information corresponding to the first physical unit according to the first temperature status;

in response to the first temperature status and the second temperature status not meeting the first condition, performing a third write operation on the first physical unit under the second temperature status to store second data instructed by the write command to the first physical unit; and updating the temperature status identification information corresponding to the first physical unit according to the second temperature status.

8. The memory management method according to claim 1, further comprising:

under the first temperature status, instructing the rewritable non-volatile memory module to use a first electrical parameter to program at least one memory cell in the first physical unit; and under the second temperature status, instructing the rewritable non-volatile memory module to use a second electrical parameter to program the at least one memory cell, wherein the first electrical parameter is different from the second electrical parameter.

9. A memory storage device, comprising:

a connection interface unit, configured to couple to a host system;

a rewritable non-volatile memory module, comprising a plurality of physical units; and a memory control circuit unit, coupled to the connection interface unit and the rewritable non-volatile memory module, wherein the memory control circuit unit is configured to detect a first temperature status of the rewritable non-volatile memory module, the memory control circuit unit is further configured to perform a first write operation on a first physical unit among the plurality of physical units under the first temperature status to store first data to the first physical unit, after performing the first write operation, the memory control circuit unit is further configured to detect a second temperature status of the rewritable non-volatile memory module, the memory control circuit unit is further configured to, in response to the first temperature status and the second temperature status meeting a first condition, determine whether a temperature status of the rewritable non-volatile memory module is maintained under the second temperature status for more than a specific time period; and only after the temperature status of the rewritable non-volatile memory module being maintained under the second temperature status for more than the specific time period, perform a data refresh operation on the first physical unit under the second temperature status to re-store the first data to a second physical unit among the plurality of physical units, wherein the second physical unit is different from the first physical unit.

10. The memory storage device according to claim 9, wherein the memory control circuit unit is further configured to judge that the first temperature status and the second temperature status meet the first condition in response to a temperature difference value between a temperature value corresponding to the first temperature status and a temperature value corresponding to the second temperature status is greater than a threshold or falls within a specific value range.

11. The memory storage device according to claim 9, wherein the memory control circuit unit is further configured to:

obtain a trigger threshold corresponding to the first temperature status;

obtain a temperature value of the rewritable non-volatile memory module under the second temperature status;

compare the trigger threshold with the temperature value; and judge whether the first temperature status and the second temperature status meet the first condition according to a comparison result.

12. The memory storage device according to claim 9, wherein the operation of detecting the second temperature status of the rewritable non-volatile memory module comprises:

receiving a write command from the host system; and in response to the write command, judging whether the first temperature status and the second temperature status meet the first condition.

13. The memory storage device according to claim 12, wherein the memory control circuit unit is further configured to:

in response to the first temperature status and the second temperature status meeting the first condition, perform a second write operation on the second physical unit under the second temperature status to store second data instructed by the write command to the second physical unit; and update temperature status identification information corresponding to the second physical unit according to the second temperature status.

14. The memory storage device according to claim 12, wherein the memory control circuit unit is further configured to:

perform a second write operation on the first physical unit under the second temperature status to store second data instructed by the write command to the first physical unit; and during the data refresh operation, instruct the rewritable non-volatile memory module to read the first data along with the second data from the first physical unit to be stored to the second physical unit together.

15. The memory storage device according to claim 12, wherein the memory control circuit unit is further configured to:

record temperature status identification information corresponding to the first physical unit according to the first temperature status;

in response to the first temperature status and the second temperature status not meeting the first condition, perform a third write operation on the first physical unit under the second temperature status to store second data instructed by the write command to the first physical unit; and update the temperature status identification information corresponding to the first physical unit according to the second temperature status.

16. The memory storage device according to claim 9, wherein the memory control circuit unit is further configured to:

under the first temperature status, instruct the rewritable non-volatile memory module to use a first electrical parameter to program at least one memory cell in the first physical unit; and under the second temperature status, instruct the rewritable non-volatile memory module to use a second electrical parameter to program the at least one memory cell, wherein the first electrical parameter is different from the second electrical parameter.

17. A memory control circuit unit, configured to control a rewritable non-volatile memory module, wherein the rewritable non-volatile memory module comprises a plurality of physical units, and the memory control circuit unit comprises:

a host interface, configured to couple to a host system;

a memory interface, configured to couple to the rewritable non-volatile memory module; and a memory management circuit, coupled to the host interface and the memory interface, wherein the memory control circuit unit is configured to detect a first temperature status of the rewritable non-volatile memory module, the memory management circuit is further configured to perform a first write operation on a first physical unit among the plurality of physical units under the first temperature status to store first data to the first physical unit, after performing the first write operation, the memory management circuit is further configured to detect a second temperature status of the rewritable non-volatile memory module, and the memory management circuit is further configured to, in response to the first temperature status and the second temperature status meeting a first condition, determine whether a temperature status of the rewritable non-volatile memory module is maintained under the second temperature status for more than a specific time period; and only after the temperature status of the rewritable non-volatile memory module being maintained under the second temperature status for more than the specific time period, perform a data refresh operation on the first physical unit under the second temperature status to re-store the first data to a second physical unit among the plurality of physical units, wherein the second physical unit is different from the first physical unit.

18. The memory control circuit unit according to claim 17, wherein the memory management circuit is further configured to judge that the first temperature status and the second temperature status meet the first condition in response to a temperature difference value between a temperature value corresponding to the first temperature status and a temperature value corresponding to the second temperature status is greater than a threshold or falls within a specific value range.

19. The memory control circuit unit according to claim 17, wherein the operation of detecting the second temperature status of the rewritable non-volatile memory module comprises:

receiving a write command from the host system; and in response to the write command, judging whether the first temperature status and the second temperature status meet the first condition.

20. The memory control circuit unit according to claim 19, wherein the memory management circuit is further configured to:

in response to the first temperature status and the second temperature status meeting the first condition, perform a second write operation on the second physical unit under the second temperature status to store second data instructed by the write command to the second physical unit; and update temperature status identification information corresponding to the second physical unit according to the second temperature status.

21. The memory control circuit unit according to claim 19, wherein the memory management circuit is further configured to:

perform a second write operation on the first physical unit under the second temperature status to store second data instructed by the write command to the first physical unit; and during the data refresh operation, instruct the rewritable non-volatile memory module to read the first data along with the second data from the first physical unit to be stored to the second physical unit together.

22. The memory control circuit unit according to claim 19, wherein the memory management circuit is further configured to:

record temperature status identification information corresponding to the first physical unit according to the first temperature status;

in response to the first temperature status and the second temperature status not meeting the first condition, perform a third write operation on the first physical unit under the second temperature status to store second data instructed by the write command to the first physical unit; and update the temperature status identification information corresponding to the first physical unit according to the second temperature status.

23. The memory control circuit unit according to claim 17, wherein the memory management circuit is further configured to:

under the first temperature status, instruct the rewritable non-volatile memory module to use a first electrical parameter to program at least one memory cell in the first physical unit; and under the second temperature status, instruct the rewritable non-volatile memory module to use a second electrical parameter to program the at least one memory cell, wherein the first electrical parameter is different from the second electrical parameter.

* * * * *